(12) United States Patent
Debeauvais

(10) Patent No.: US 12,371,018 B2
(45) Date of Patent: Jul. 29, 2025

(54) DRIVER ASSISTANCE METHOD WITH VIRTUAL TARGET FOR ADAPTIVE CRUISE CONTROL

(71) Applicants: RENAULT S.A.S, Boulogne-Billancourt (FR); NISSAN MOTOR CO., LTD., Yokohama (JP)

(72) Inventor: Rodolphe Debeauvais, Versailles (FR)

(73) Assignees: AMPERE S.A.S., Boulogne-Billancourt (FR); NISSAN MOTOR CO., LTD., Yokohama (JP)

(*) Notice: Subject to any disclaimer, the term of this patent is extended or adjusted under 35 U.S.C. 154(b) by 327 days.

(21) Appl. No.: 17/999,785

(22) PCT Filed: May 5, 2021

(86) PCT No.: PCT/EP2021/061879
§ 371 (c)(1),
(2) Date: Nov. 23, 2022

(87) PCT Pub. No.: WO2021/239420
PCT Pub. Date: Dec. 2, 2021

(65) Prior Publication Data
US 2023/0234585 A1    Jul. 27, 2023

(30) Foreign Application Priority Data
May 27, 2020  (FR) ..................... 20 05587

(51) Int. Cl.
*B60W 30/16* (2020.01)
*B60W 40/04* (2006.01)

(52) U.S. Cl.
CPC ............ *B60W 30/16* (2013.01); *B60W 40/04* (2013.01); *B60W 2520/10* (2013.01);
(Continued)

(58) Field of Classification Search
None
See application file for complete search history.

(56) References Cited

U.S. PATENT DOCUMENTS

| 5,629,851 A | 5/1997 | Williams et al. |
| 2014/0005908 A1* | 1/2014 | Kollberg ............... G01S 13/726 701/96 |

(Continued)

FOREIGN PATENT DOCUMENTS

| EP | 0 605 104 A1 | 7/1994 |
| EP | 2 658 763 A1 | 11/2013 |

(Continued)

OTHER PUBLICATIONS

Xinjie Zhang, Longitudinal acceleration allocation for cooperative adaptive cruise control including platoon kinematics, 2019 IEEE 28th International Symposium on Industrial Electronics (ISIE) (Year: 2019).*

(Continued)

*Primary Examiner* — Wade Miles
*Assistant Examiner* — Arslan Azhar
(74) *Attorney, Agent, or Firm* — Oblon, McClelland, Maier & Neustadt, L.L.P.

(57) ABSTRACT

A driver assistance method for an ego vehicle (EGO) travelling in a traffic lane, includes: identifying traffic surrounding the ego vehicle in the same traffic lane as the ego vehicle and in adjacent parallel lanes travelling in the same direction; determining a virtual barycentric target, including calculating a position of the virtual barycentric target, a speed of the virtual barycentric target, and an acceleration of the virtual barycentric target; calculating a longitudinal speed setpoint of the ego vehicle, an acceleration setpoint, and a torque setpoint, the longitudinal speed setpoint being a function of the position of the virtual barycentric target, the speed of the virtual barycentric target, and the acceleration of the virtual barycentric target.

8 Claims, 3 Drawing Sheets

Figure 1:
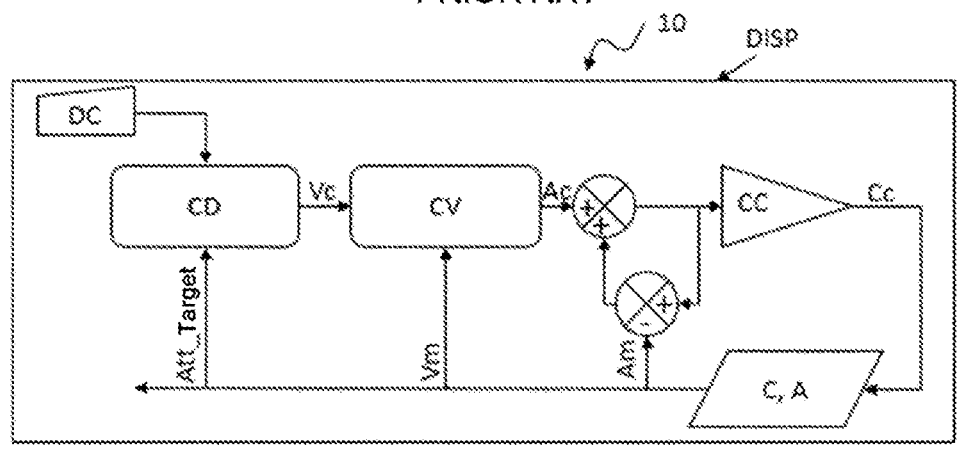

(52) U.S. Cl.
CPC ............... *B60W 2554/4045* (2020.02); *B60W 2554/801* (2020.02); *B60W 2554/802* (2020.02); *B60W 2554/804* (2020.02)

(56) References Cited

U.S. PATENT DOCUMENTS

| | | | |
|---|---|---|---|
| 2015/0100216 A1* | 4/2015 | Rayes | G01S 13/867 |
| | | | 701/96 |
| 2018/0043890 A1 | 2/2018 | Keller et al. | |
| 2019/0061766 A1* | 2/2019 | Nishiguchi | B62D 15/0255 |
| 2020/0290611 A1* | 9/2020 | Tang | B60W 30/143 |

FOREIGN PATENT DOCUMENTS

| | | |
|---|---|---|
| EP | 3 281 831 A1 | 2/2018 |
| FR | 2 787 586 A1 | 6/2000 |
| JP | 3812384 B2 * | 8/2006 |

OTHER PUBLICATIONS

International Search Report issued Jun. 14, 2021 in PCT/EP2021/061879 filed on May 5, 2021, 2 pages.
Preliminary French Search Report issued Feb. 12, 2021 in French Patent Application No. 20 05587 filed May 27, 2020, 3 pages (with Translation of Category of Cited Documents).

* cited by examiner

DRIVER ASSISTANCE METHOD WITH VIRTUAL TARGET FOR ADAPTIVE CRUISE CONTROL

The invention concerns a driver assistance method with virtual target for adaptive cruise control. It finds an advantageous application in the form of a driver assistance method for an ego vehicle in an automobile vehicle equipped with a driver assistance system of this kind.

It also concerns a computer program product the instructions of which are adapted to implement a method of this kind.

It further concerns a driver assistance system for an ego automobile vehicle.

It also concerns an automobile vehicle including a powertrain, braking means and an assistance system of this kind.

Driver assistance technologies are increasingly widespread and are no longer limited to top-of-the-range vehicles.

These technologies make it possible to simplify the driving of automobile vehicles and/or to render reliable the behaviours of the drivers of the vehicles.

Automated cruise control systems are routinely installed on modern vehicles, generally functioning on the basis of a regulation of the distance between the equipped vehicle, also known as an ego vehicle, and that which precedes it in its traffic lane, termed the target vehicle or more simply the target.

It is well known to equip an automobile vehicle with an adaptive cruise control device (ACC system).

An adaptive cruise control system of this kind comprises a means for detecting the environment of the vehicle such as a radar and is therefore able to detect other vehicles or objects on the carriageway, and in particular is able to detect a vehicle that is preceding it on the carriageway.

These systems are for example designed to control the vehicle so that its speed is equal to a setpoint set by the driver, except in the presence of events on the road necessitating slowing of the vehicle (following a vehicle traveling at a speed different from the setpoint set by the driver, traffic jam, traffic light, etc.), in which case the speed of the vehicle is controlled accordingly.

Thereafter the speed of the vehicle equipped with an adaptive cruise control system of this kind can be adjusted to preserve a substantially constant safety distance from the vehicle that precedes it. Accordingly, a system of this kind interacts with a control system of the engine and/or with a braking system in order to accelerate or to decelerate the vehicle.

Adaptive cruise control systems known in the prior art sometimes lack reliability. Late speed corrections can cause sudden accelerations or decelerations causing discomfort and a lack of a feeling of safety. Such situations may in particular arise if the target vehicle changes traffic lane or a vehicle merges into the traffic lane of the ego vehicle.

One embodiment of a vehicle equipped with a controller employing a classic adaptive cruise control method is described hereinafter with reference to FIG. 1.

The automobile vehicle 10 is an automobile vehicle of any type, in particular a passenger vehicle or a utility vehicle. In this document the vehicle including the means for implementing the invention is termed the "ego" vehicle. This designation serves only to distinguish it from other surrounding vehicles and does not in itself impart any technical limitation on the automobile vehicle 10.

The automobile vehicle 10 or ego vehicle 10 includes a conventional adaptive cruise control device DISP employing a classic adaptive cruise control method, in particular in the form of a controller.

The classic adaptive cruise control device DISP of an automobile vehicle may be part of a more general driver assistance system.

In the remainder of the document the expression target vehicle refers to a vehicle situated in the traffic surrounding the ego vehicle 10, the kinematic attributes of which, including the position, speed and acceleration, are taken into account in the calculation of the longitudinal speed setpoint of the ego vehicle.

A target vehicle may be an automobile vehicle of any type, in particular a passenger vehicle, a utility vehicle or else a motorcycle.

The adaptive cruise control device DISP of an automobile vehicle necessitates perception of the vehicles situated in the surrounding traffic, in particular by means of sensors C such as perception and location sensors. In fact, the determination of the kinematic attributes Att_Target that are the relative dynamic presence in the lane, position, speed and acceleration of the surrounding vehicles by the sensors C is therefore required in order to be able to locate them correctly. The data from the perception sensors are in particular processed by merging it in order to identify and to characterize the surrounding objects with their kinematic attributes. These perception sensors may employ diverse technologies, for example ultrasound, radar, lidar, video camera, and the location sensors are in particular inertial or odometric measurement units or else GPS global positioning satellite systems. The characterization of the objects makes it possible in particular to be aware of the environment around the ego vehicle and to classify the objects by type, such as: vehicles (motorcycle, car, lorry, bicycle, etc.), pedestrians, infrastructures, signals, which makes it possible to take into account here as targets only vehicles. The data from these sensors, in particular associated with maps, also make it possible to identify the geometry of the road (slopes, curves, etc.) and additionally navigation information can make it possible to supply information as to the contextual situation as a function of the position of the vehicle given by the perception: zone type (urban, suburban, rural), road type (high-speed road, town, interstate, etc.), speed limit, which may be merged with the recognition of signs, road traffic information, geometric information (slope, curve, number of lanes, etc.). The kinematic attributes Att_Target of the identified target are then transmitted to the distance control unit CD that also takes as input driver data DC that is the control speed selected by the driver and the predetermined following time chosen by the driver, by default 2 seconds, which is also translated into a predetermined following distance setpoint chosen by the driver as a function of the speed of the ego vehicle, for example by means of a table.

On the basis of this information the distance control unit CD generates as output a longitudinal speed setpoint Vc enabling automatic compliance with the predetermined following distance setpoint relative to the preceding vehicle in the same traffic lane, the vehicle automatically modulating its speed to maintain that distance. This speed setpoint Vc and the speed Vm of the ego vehicle, obtained in particular from the measurements from the sensors C, in particular wheel speed sensors, the measurements from which are averaged and associated with a Kalman filter, are then sent to the input of the speed control unit CV that generates as output an acceleration setpoint Ac enabling, after looping with the acceleration data Am of the ego vehicle obtained from sensors C, in particular from an inertial measurement unit, or else based on the measured wheel speed, as soon as the lane is free in front of the ego vehicle, to increase its acceleration automatically to achieve the control speed selected by the driver, the torque of the actuators A (engine, brakes, etc.) being controlled by the torque setpoint Cc generated at the output of the torque control unit CC, being a function of the consolidated acceleration command on leaving the loop, thus making it possible to assist the driver in their driving task. However, this device considers only one target at a time, the one that is present in front of the ego in its lane, which renders it highly sensitive, in particular to merging of vehicles between the ego and the vehicle that precedes it as well as to a change of lane by the target vehicle, degrading the smoothness of control with sudden irregularities of setpoints.

Also known is the document FR2912981 which concerns an automatic driving method for an automobile vehicle comprising an ACC system the object of which is to improve the smoothness of the behaviour of the vehicle to enhance the comfort of the user, however this method comes to consume a great deal of energy in the event of multiple targets because it necessitates numerous calculations to determine the dynamic components to be tracked by the ACC system.

One of the objects of the invention is to remedy at least some of the disadvantages of the prior art by providing a driver assistance method for an ego vehicle traveling in a traffic lane, comprising:
  a first step of identifying traffic surrounding the ego vehicle in the traffic lane of the ego vehicle and in at least one adjacent parallel lane in the same traffic direction;
  a second step of determining a virtual barycentric target, with calculation of a position of the virtual barycentric target, a speed of the virtual barycentric target and an acceleration of the virtual barycentric target;
  a third step of calculating a longitudinal speed setpoint of the ego vehicle, an acceleration setpoint and a torque setpoint, said longitudinal speed setpoint being a function of the position of the virtual barycentric target, the speed of the virtual barycentric target and the acceleration of the virtual barycentric target.

Thanks to the invention, it is possible to anticipate the trajectory of the vehicles situated in the surrounding traffic without modifying the ACC control loop as such but only its inputs, and to take into account multiple targets, including in the absence of any target in the lane of the ego vehicle, whilst improving the smoothness of the ACC control loop.

In accordance with an advantageous feature, the surrounding traffic includes at least two target vehicles preceding the ego vehicle traveling in its traffic lane or in the adjacent parallel lane in the same traffic direction, which makes it possible not only to take into account vehicles to the side but also a vehicle slowing down in front of the vehicle preceding the ego.

In accordance with another advantageous feature, the first, identification step includes a sub-step of detection of each of the at least two target vehicles with for each target vehicle determination as output of a position of the target vehicle relative to the ego vehicle, a speed of the target vehicle and an acceleration of the target vehicle, and in particular determination of a trajectory of the target vehicle, which makes it possible, whether the position is relative or absolute, to anticipate the safe distances by taking into account the predicted trajectories.

In accordance with another advantageous feature, the second step of determination of the virtual barycentric target consumes as input a preselected control speed, a predetermined following distance setpoint and a result of the identification step, which makes it possible to construct the virtual barycentric target on the basis of readily available information, and taking into account the control speed and the following distance setpoint that can be customized by the driver.

The second step of determination of the virtual barycentric target advantageously includes a filtering step in such a manner as to select only some targets as a function of their speed or of their spacing in terms of time.

In accordance with another advantageous feature, at least one of the target vehicles is situated in the traffic lane of the ego vehicle, making it possible to take into account the phenomena of slowing by the preceding vehicles, but also one of these vehicles preceding the ego leaving the lane.

The advantage linked to the feature whereby at least one of the target vehicles is situated in an adjacent lane and seeks to merge into the traffic lane of the ego vehicle, is enabling merging phenomena to be taken into account by anticipation.

In accordance with another advantageous feature, the second step of determination of the virtual barycentric target uses a change of target prediction coefficient determined for each target, which makes it possible to weight the barycenter dynamically and therefore to improve ACC smoothness.

In accordance with another advantageous feature, the change of target coefficient is a function of a relative lateral distance between a trajectory of the ego vehicle and at least one target vehicle, or a function of a relative lateral distance between a center of the lane in which the ego vehicle is traveling and at least one target vehicle, which makes it possible to ignore curves in the road.

In accordance with another advantageous feature, the change of target coefficient is a function of an estimated time of intersection of an estimated trajectory of the target vehicle with an estimated trajectory of the ego vehicle, which makes it possible to apply weighting using other information provided by the module for identification of the surrounding traffic.

The change of target coefficient is advantageously a function of the following time of a pre-target vehicle, which makes it possible smoothly to take into account a vehicle traveling in front of the vehicle preceding the ego slowing down.

In accordance with another advantageous feature, the change of target coefficient is a function of a coefficient of stiffness, thereby guaranteeing an update facility because this coefficient of stiffness is in particular unique for all merging targets.

The invention also concerns a computer program product comprising program code instructions stored on a computer-readable medium comprising instructions which, when the program is executed by the computer, cause the latter to execute the method of the invention, which program product has advantages analogous to those of the method, this program product being easily installed in an automobile vehicle computer.

The invention also concerns a system for an ego automobile vehicle moving in a traffic lane, comprising:
  a module for identification of traffic surrounding the ego vehicle in the traffic lane of the ego vehicle and in at least one adjacent parallel lane in the same traffic direction;

a module for determination of a virtual barycentric target, with calculation of a position of the virtual barycentric target, a speed of the virtual barycentric target and an acceleration of the virtual barycentric target, a module for calculation of a longitudinal speed setpoint of the ego vehicle, an acceleration setpoint and a torque setpoint, said longitudinal speed setpoint being a function of the position of the virtual barycentric target, the speed of the virtual barycentric target and the acceleration of the virtual barycentric target, which has advantages analogous to those of the method using means routinely available on vehicles such as radar, video camera.

The invention also concerns an ego automobile vehicle including a powertrain, acceleration and braking means and a driver assistance system according to the invention, which enables simple fitting to vehicles provided with ACC devices, whether autonomous or not.

Figure 2:
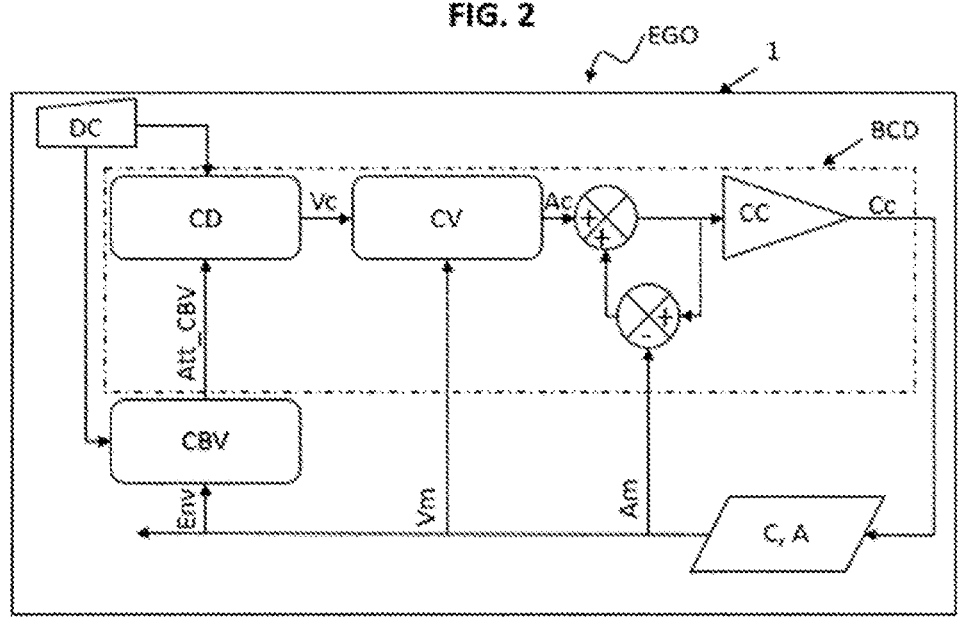
Figure 3:
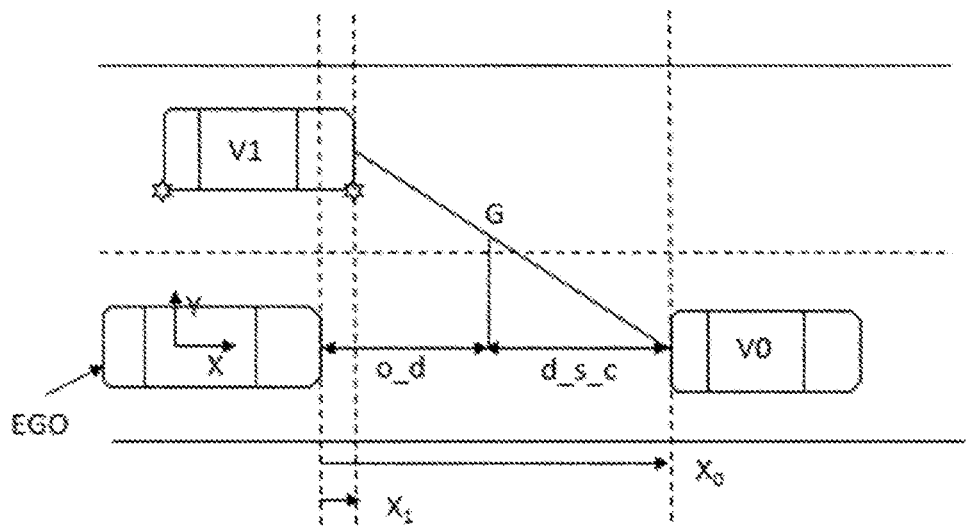
Figure 4:
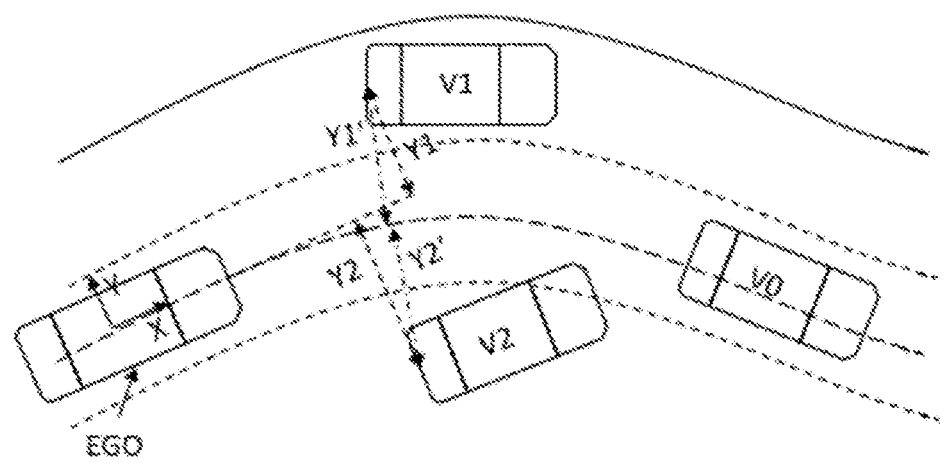
Figure 5:
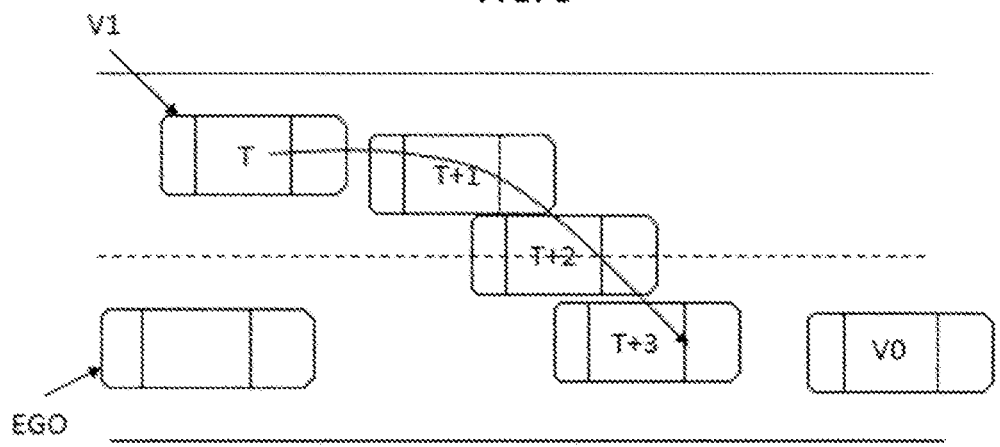
Figure 6:
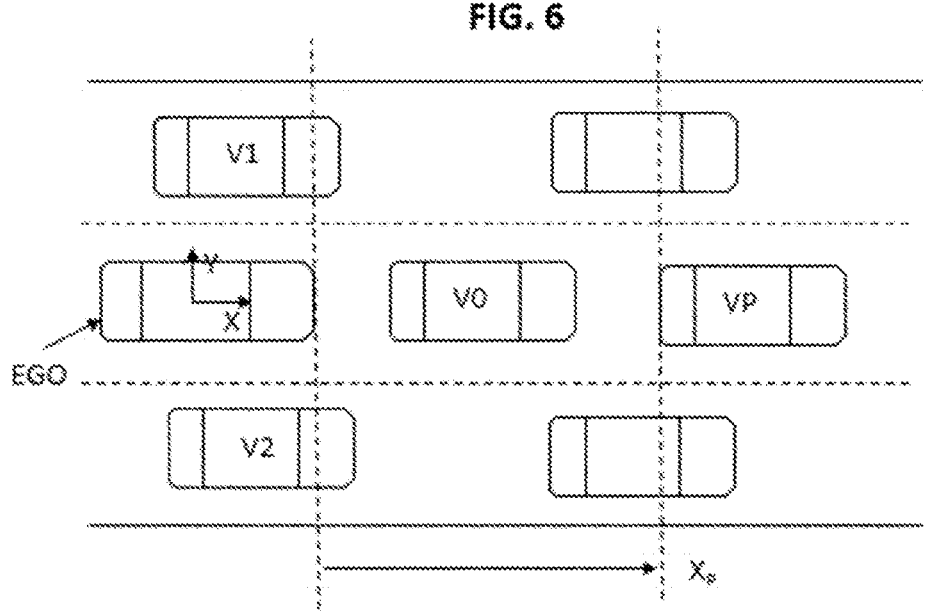

Other aims, features and advantages of the invention will become apparent on reading the following description given by way of non-limiting example only with reference to the appended drawings, in which:

FIG. 1, already mentioned, schematically illustrates a classic prior art ACC device, and FIG. 2 represents schematically a driver assistance system according to the invention, and FIG. 3 illustrates the application of the method according to the invention, and FIG. 4 represents an illustration of relative lateral distance in a curve in one case of use of the invention, and FIG. 5 represents an illustration of trajectory prediction in one case of use according to the invention, and FIG. 6 represents another case of use of the invention.

Throughout the text directions and orientations are designated with reference to a right-handed coordinate system XYZ classically used in automobile design, in which X designates the longitudinal direction of the vehicle, in the direction of forward movement of the vehicle, Y is the direction transverse to the vehicle, directed toward the left, and Z is the vertical direction, directed upward. The concepts "front" and "rear" are indicated with reference to the normal direction of forward movement of the vehicle. Throughout the description the term "substantially" means that a slight difference may be allowed relative to a determined nominal quantity, for example "substantially constant" means that a difference of the order of 5% is permitted in the context of the invention. For greater clarity identical or similar elements are represented by identical reference signs in all the figures.

Schematically represented in FIG. 2 is one embodiment of an adaptive cruise control system 1 of an automobile vehicle EGO that is part of a more general driver assistance system in accordance with one aspect of the invention. The elements of the system 1 identical to the elements constituting the device DISP in FIG. 1 bear the same references.

In this driver assistance system according to the invention are found sensors C such as perception sensors enabling measurement of the dynamics of the ego but also perception of the environment, these sensors C here make it possible not only to provide information as to the speed and the acceleration of the ego, as well as the position, speed and acceleration of the objects in the environment, but also to supply the trajectory prediction for those objects. In fact, the determination of the environmental information Env that includes the kinematic attributes that are the presence in the lane, dynamic relative position, speed and acceleration of the surrounding vehicles by the sensors C is required to be able to predict their trajectories correctly. This environmental information is for example given in a frame of reference of the ego, positioned at the level of the rear axle of the ego vehicle, but any other position of the frame of reference is possible. Likewise the environmental information concerning the position of the other vehicles is often based on the detection of the rear axle. All this environmental information Env obtained by merging the data from the sensors C is indexed object by object and generated at the output of what is referred to here as an identification module (not represented) for identification of traffic surrounding the ego vehicle on the traffic lane of the ego vehicle and on adjacent parallel lanes in the same traffic direction and sent as input to the module CBV for determination of a virtual barycentric target. The identification module merges the information already mentioned from the sensors C and information from signal lights such as the turn indicators of the surrounding vehicles. A change of position frame of reference could then be effected upstream or in the module CBV to determine distances no longer axle to axle but rather bumper to bumper, as illustrated in FIG. 3 and the subsequent figures.

The module CBV also consumes as input the driver data DC that consists of the control speed selected by the driver and the predetermined following time chosen by the driver, which is also translated into a predetermined following distance setpoint chosen by the driver. As a function of these inputs the module CBV determines a virtual barycentric target in the lane of the ego vehicle, of which it calculates the position, speed and acceleration. This module CBV makes it possible to take into consideration the information from the various objects, to select as target the objects situated in particular upstream of the ego vehicle whether that is in its lane or to the side, and to deduce therefrom the target vehicles for which the predicted trajectories have been predetermined so as to be able to anticipate the movements of the target vehicles and therefore to react as a human driver would. In order to filter small oscillations linked to measurement errors, a filter may be added in the module CBV so as to take into consideration only targets for which the relative lateral speed with respect to the ego exceeds a threshold. This module CBV is placed upstream of the control loops of the actuator A subsystems (engine, brakes, etc.) and also supplies the control setpoints like a classic ACC target without having to modify the ACC logic, thereby facilitating its integration. In fact, these kinematic attributes Att_CBV of the virtual barycentric target that are the presence in the lane, dynamic relative position, speed and acceleration of the virtual barycentric target, generated as output of the module CBV for determination of a virtual barycentric target, are sent as input to the loop BCD for calculation of the dynamic setpoints that comprise the longitudinal speed setpoint Vc of the ego vehicle and the acceleration setpoint Ac, said longitudinal speed setpoint being a function of the position of the virtual target, the speed of the virtual target and the acceleration of the virtual barycentric target. The dynamic setpoint calculation loop BCD combines:

the distance control unit CD that consumes as input the kinematic attributes Att_CBV of the virtual barycentric target as well as the driver data DC that consist of the control speed selected by the driver and the predetermined following time chosen by the driver, which is also translated into a predetermined following distance setpoint chosen by the driver, and which generates as output the longitudinal speed setpoint Vc, which corresponds to the required speed control magnitude making it possible to satisfy the expectations of the driver in terms of safe distance with total smoothness, the speed control unit CV that as before consumes as input the speed setpoint Vc and the speed Vm of the ego vehicle and that generates as output the acceleration setpoint Ac, the torque control unit CC that consumes as before as input the consolidated acceleration command on leaving the loop, and which generates as output the torque setpoint Cc controlling the actuators A, this torque setpoint Cc making it possible to control the wheels in such a manner as to track the speed setpoint Vc.

The module CBV for determination of the single virtual barycentric target makes it possible to take into account surrounding vehicles alongside that could in the near future merge and become the target to be tracked by the ACC, but this module CBV also has for object guaranteeing the normal control functioning of the ACC when no vehicle is detected either in front or to the side or when only one target vehicle is detected in the lane of the vehicle. This method may advantageously also be applied to a vehicle V0 leaving the lane of the ego vehicle in order to change lane, known as cutting out. Once this vehicle has entered the lane to the side of the ego vehicle it would then become a vehicle Vx or would no longer be indexed if it exits the field of approach of the ego vehicle determined by the perception distances of the sensors and/or a predetermined distance away from the ego vehicle, in particular as a function of the following distance setpoint that can be customized by the driver.

As illustrated in FIG. 3, in a straight line the ego vehicle EGO perceives two target vehicles, as determined by the module for identification of the surrounding traffic, a vehicle V0 in front of it in its lane and a vehicle V1 slightly in front of it and located on its left side, in the left-hand lane, and the right turn indicators of which are activated to indicate that it is going to move into the lane of the ego vehicle. The three lanes in the same traffic direction are represented by short dashed lines and a solid line represents their separation from a potential lane in the opposite direction. Although in this example the target vehicle V1 is to the left of the ego vehicle EGO in the direction of forward movement, as an alternative the target vehicle V1 may be on the right-hand side of the ego vehicle EGO and seeking to enter the lane of the ego vehicle, for example by activating its left-hand turn indicator. Here the virtual barycentric target G therefore corresponds to the barycenter G of a system (A, a)(B, b) with a+b≠0, a and b being weighting coefficients, and for any point O taken as the origin, we have:

$$\overrightarrow{OG} = \frac{1}{a+b}\left(a\overrightarrow{OA} + b\overrightarrow{OB}\right) \quad \text{[Math. 1]}$$

The module for identification of the surrounding traffic supplies in the frame of reference linked to the ego vehicle, here centred on its rear axle but for which another choice could be made, to the module CBV for determination of the virtual barycentric target G the geometrical references corresponding to the points A and B that are the positions of the vehicles V0 and V1, and the module CBV effects a change of frame of reference in such a manner as to link the new frame of reference of the ego vehicle to the front of the bumper of the ego vehicle:

$X_0$, which is the distance of the first target vehicle, in particular of its rear bumper, in the field of direct approach of the ego vehicle, in the relative frame of reference linked to the ego vehicle.

$X_1$ is the distance of a second target vehicle, in particular of its front bumper, which risks entering the field of approach of the ego vehicle in the relative frame of reference linked to the ego vehicle.

$\dot{X}_0$ and $\dot{X}_1$ are the respective relative speeds of the first vehicle and of the second vehicle.

Likewise $\ddot{X}_0$ and $\ddot{X}_1$ are the respective relative accelerations of the first vehicle and of the second vehicle.

The aim of the virtual barycentric target approach is to anticipate the change of target by adding a dynamic offset o_d to the following distance setpoint d_s_c supplied by the driver and applied to the target vehicle V0 in the lane. The sum of the dynamic offset distances o_d and following distance setpoint d_s_c constituting the distance between vehicles to be left between the front of the ego vehicle EGO and the rear of the target vehicle V0 sharing the same lane. The offset o_d is obtained by projecting onto the trajectory of the ego the virtual barycentric target G, after which the offset o_d will be transmitted to the module CD, with the position information on the virtual barycentric target G, with the other kinematic attributes Att_CBV. The weighting coefficients a, b of the barycenter are chosen as corresponding to change of target prediction coefficients. These coefficients can be obtained in two different ways.

The first way is based on the lateral position of the merging vehicle V1. Accordingly, the closer the lateral target vehicle V1 approaches the lane of the ego vehicle EGO the more it is considered probable that it is going to merge into said lane. Preferably, rather than the ordinate Y1 of the vehicle it is preferable to use the lateral distance Y1' relative to the trajectory and/or to the center of the lane of the ego vehicle EGO, which here coincide and are represented in long dashed lines. This makes it possible to circumvent disturbances linked to the orientation of the ego vehicle EGO in its lane that is in the form of a tangent multiplied by the distance to the target (5° at 100 metres=8 metres of lateral error). The method could therefore be functional in a curve.

FIG. 4 indicates visually the error that occurs in a curve, the values of Y1 and Y2 corresponding to the ordinates of the rear ends, for example the middle of the bumpers, of the lateral target vehicles V1 and V2 in the relative frame of reference linked to the ego vehicle and the values Y1' and Y2' corresponding to the lateral distances relative to the center of the lane of the ego vehicle EGO of the lateral target vehicles V1 and V2, where it is seen that, concerning the lateral distances, Y1'>Y2', whereas with the ordinates Y1<Y2. The lateral distance values are in particular supplied by the module for identification of the surrounding traffic on the same terms as the position of the targets. Weighting coefficients a and b are therefore obtained as a function of the lateral distance, and in particular a as a function of Y1' and b as a function of the reciprocal of Y1'.

The second method, illustrated in FIG. 5, consists in the use as a change of target prediction coefficient the estimated time of intersection with the trajectory of the ego vehicle EGO, corresponding here to 3 seconds, T+3. The estimated time of intersection with the trajectory of the ego EGO is based on the trajectory prediction, both being supplied by the module for identification of the surrounding traffic on the same terms as the position of the targets.

Hereinafter the prediction coefficients based on the lateral position of the merging vehicle V1 will be used but the application would be the same with the second method.

The weighting coefficients a and b preferably employ a coefficient k of stiffness, or updating coefficient, in particular in the following manner: a=Y1'; b=k/Y1'

The coefficient k of stiffness is therefore placed at the level of the magnitude X1, which is the magnitude representing the merging vehicle V1. From a behavioural point of view, this coefficient makes it possible to define the strength of taking into account the target that is introduced into the calculation of the virtual target; the greater k, the more the ego vehicle will anticipate. Given that the problem is symmetrical with respect to the axis x, the coefficient k for a target on the right and the coefficient k for a target on the left will be identical, which enables application of the method equally well in countries that drive on the right as in countries that drive on the left, without any specific modification. The choice to use weighting coefficients a, b that are inversely proportional (a=1/b) makes it possible to retain the proportions modulo the coefficient of stiffness, which is essential for the equilibrium of the barycenter, its representivity and proportionality, and which facilitates the management of limits. The equations are then obtained for the three position, speed, acceleration magnitudes of the barycenter G of the target vehicles V0, V1:

$$X_G = \frac{Y_1' \cdot X_0 + \frac{k}{Y_1'} X_1}{Y_1' + \frac{k}{Y_1'}}$$ [Math. 2]

$$\dot{X}_G = \frac{Y_1' \cdot \dot{X}_0 + \frac{k}{Y_1'} \dot{X}_1}{Y_1' + \frac{k}{Y_1'}} \text{ and}$$

$$\ddot{X}_G = \frac{Y_1' \cdot \ddot{X}_0 + \frac{k}{Y_1'} \ddot{X}_1}{Y_1' + \frac{k}{Y_1'}}$$

These magnitudes are calculated at each time increment, so that the barycenter G takes as conditions variations of distances to the targets, variations of speeds and variations of acceleration throughout the maneuver, and does this dynamically. The values of Y1' and k/Y1' are here not taken into account in the derivation because these are coefficients considered to be without units, and if Y1' corresponds to a lateral distance this could also be a merging time as already stated. It is also possible to calculate XG and then to differentiate it to obtain the other magnitudes, of speed and of acceleration. Moreover, the fact that the weighting coefficients a, b are a function of the lateral position of the lateral target V1 or of the merging time makes it possible to take into account the merging dynamics. The more the target vehicle V1 merges into the lane of the ego vehicle EGO, the more the magnitudes of the merging vehicle V1 are taken into account. Only one single coefficient k of stiffness is advantageously necessary for the three equations, which makes it possible greatly to simplify updating. This coefficient k of stiffness could be adapted according to the speed of the ego vehicle so as to have a different behaviour depending on the situation (free flowing interstates or gridlocked urban ring roads), and its value may in particular be in the range]0; 10] and preferably have the value 1.

Creating a virtual barycentric target G with a distance, a speed and an acceleration is advantageously not intrusive in the conventional ACC loops. Consequently, the method of the invention does not in any way modify the adjustments of control of the powertrain, whether it be internal combustion or electric, and also does not modify in any way the adjustments of the braking device. Moreover, the method advantageously has a spatial representation that enables easy visualization during its updating, as already illustrated in FIG. 3, which shows graphically the calculation effected to produce the barycenter G of the positions of the target vehicles V0, V1. In physical terms, the application of the method amounts to adding an offset o_d to the following distance setpoint d_s_c.

Once the vehicle V1 has merged into the lane of the ego vehicle EGO between the ego vehicle EGO and the vehicle V0, it then becomes indexed as the vehicle V0.

As already mentioned the method can advantageously also take into account a target situated either to the right or to the left and in particular makes it possible to take into consideration a plurality of targets, whether they are located to the right and/or to the left in front of the ego vehicle EGO. In a similar way to the merging of a target vehicle V1 between the ego vehicle EGO and the vehicle V0 that precedes it, the method thus applies to three or more targets, as illustrated in FIG. 6. The virtual barycentric target G then corresponds to the barycenter G of a system (A, a), (B, b), (C, c) with a+b+c≠0, a, b and c being weighting coefficients, and for any point O taken as origin, we have:

$$\overrightarrow{OG} = \frac{1}{a+b+c}\left(a\overrightarrow{OA} + b\overrightarrow{OB} + c\overrightarrow{OC}\right)$$ [Math. 3]

Which gives us:

$$X_G = \frac{Y_1' \cdot Y_2' \cdot X_0 + \frac{k}{Y_1'} X_1 + \frac{k}{Y_2'} X_2}{Y_1' \cdot Y_2' + \frac{k}{Y_1'} + \frac{k}{Y_2'} - (k.NbTm)}$$ [Math. 4]

NbTm is the number of missing lateral targets to be able to apply the method including in the case of missing targets whilst complying with homogeneous dynamic behaviour. Moreover, it is necessary to define default values if one or more targets are missing. Thus in the absence of any vehicle in the lane of the ego EGO $X_0$ is taken equal to the following distance setpoint d_s_c, $\dot{X}_0$ is taken equal to the control speed selected by the driver, $\ddot{X}_0$ is taken as equal to 0, likewise in the event of absence of a lateral target Vi, $X_i, \dot{X}_i, \ddot{X}_i$, are taken as equal to 0 and $Y_i'$ is taken as equal to 1. Consequently, if the target vehicles V1 and V2 are missing then $X_G = X_0$.

The ACC target problem is compliance with the following time relative to the target that precedes it, and it is therefore also to the benefit of the ego vehicle to guard an additional safe distance if the following time between the two vehicles preceding it in its lane is dangerous. The method therefore makes it possible to monitor not only the merging of lateral target vehicles but also the behaviour of the vehicle preceding the vehicle that the ego vehicle is following. In fact, the method enables not only an application for multiple targets V1, V2 that seek to merge in front of the ego vehicle EGO but also makes it possible to take into account the vehicle VP preceding the vehicle V0 followed by the ego vehicle EGO. In fact, as represented in FIG. 6, in its lane the ego vehicle EGO follows the vehicle V0 which itself follows the vehicle VP, termed the pre-target vehicle, and in the lateral lanes are present the vehicle V1 located front left of the ego vehicle and the vehicle V2 located front right of the ego vehicle. Firstly, if interest lies only in the ego vehicle EGO, the vehicle V0 preceding it and the pre-target vehicle VP, we may write with $X_p$, the distance between the ego vehicle EGO and the pre-target vehicle VP, $\dot{X}_p$ which is its derivative with respect to time and $k_p$ which is the coefficient of stiffness in the pre-target situation and with the weighting coefficients $a = X_p/\dot{X}_p$ and $b = k_p \cdot \dot{X}_p/X_p$, the single coefficient $k_p$ of stiffness being placed at the level of the magnitude $X_p$:

$$X_G = \frac{\dfrac{X_P}{\dot{X}_P} \cdot X_0 + \dfrac{k_P \cdot \dot{X}_P}{X_P} X_P}{\dfrac{X_P}{\dot{X}_P} + \dfrac{k_P \cdot \dot{X}_P}{X_P}} = \frac{\dfrac{X_P}{\dot{X}_P} \cdot X_0 + k_P \cdot \dot{X}_P}{\dfrac{X_P}{\dot{X}_P} + \dfrac{k_P \cdot \dot{X}_P}{X_P}} \quad \text{[Math. 5]}$$

Here the weighting coefficients a, b are dependent on the following time of the pre-target VP, physically representative of the time of intersection of the trajectories in longitudinal coordinates. There are taken into account therefore at all times the two targets V0, VP, and in order for the ego vehicle not to be subject to variations on each change of speed of the pre-target VP filtering with respect to a threshold speed is preferably effected in such a manner as to take the pre-target VP into account only if its speed relative to V0 is below a threshold. The pre-target VP will therefore be taken into account only if the pre-target speed less ego speed difference is below a predetermined threshold, that threshold being for example a few km/h, in such a manner as to filter small oscillations and to take into account only close pre-targets. This threshold, which will be an updating parameter, and may eventually take into consideration the relative distance to the target to assimilate it to a following time threshold, that is to say to apply filtering by taking into account the pre-target VP as a function of the speed of the pre-target as a function of the following time adjustments by the driver, in such a manner as to take into account the pre-target VP only if the time between VP and EGO is below a predetermined threshold. The value of the coefficient $k_p$ of stiffness is preferably in the range]0; 10], knowing that the higher it is, the sooner braking is applied, and its adjustment can therefore be a function of the mode chosen by the driver, for example with a higher value in sport mode than in city mode. And in order to take into account the absence of pre-target VP there is used as before an indicator $F_{Pabs}$ of pre-target absence when it has the value 1 or of pre-target presence when it has the value 0 of the pre-target vehicle VP and default values are taken so that when the pre-target is missing: $X_G = X_0$:

$$X_G = \frac{\dfrac{X_P}{\dot{X}_P} \cdot X_0 + k_P \cdot X_P - (k_P \cdot F_{Pabs})}{\dfrac{X_P}{\dot{X}_P} + \dfrac{k_P \cdot \dot{X}_P}{X_P} - (k_P \cdot F_{Pabs})} \quad \text{[Math. 6]}$$

$$\dot{X}_G = \frac{\dfrac{X_P}{\dot{X}_P} \cdot \dot{X}_0 + \dfrac{k_P \cdot \dot{X}_P}{X_P} \dot{X}_P - (k_P \cdot F_{Pabs})}{\dfrac{X_P}{\dot{X}_P} + \dfrac{k_P \cdot \dot{X}_P}{X_P} - (k_P \cdot F_{Pabs})}$$

$$\ddot{X}_G = \frac{\dfrac{X_P}{\dot{X}_P} \cdot \ddot{X}_0 + \dfrac{k_P \cdot \dot{X}_P}{X_P} \ddot{X}_P - (k_P \cdot F_{Pabs})}{\dfrac{X_P}{\dot{X}_P} + \dfrac{k_P \cdot \dot{X}_P}{X_P} - (k_P \cdot F_{Pabs})}$$

XG is preferably calculated and then differentiated to obtain the other speed and acceleration magnitudes. The method may also take into account four (or more) targets as represented in FIG. 6: V1, V2, V0 and VP with the default values $X_0$ is taken as equal to the following distance setpoint d_s_c, $\dot{X}_0$ is taken as equal to the control speed selected by driver, $\ddot{X}_0$ is taken equal to 0, likewise in the event of absence of lateral target Vi $X_i, \dot{X}_i, \ddot{X}_i$, are taken as equal to 0 with NbTm the number of lateral targets missing and in the event of pre-target absence $F_{Pabs}=1$, so that when the lateral target vehicles are missing we obtain $X_G = X_0$:

$$X_G = \frac{Y_1' \cdot Y_2' \cdot \dfrac{X_P}{\dot{X}_P} \cdot X_0 + \dfrac{k}{Y_1'} X_1 + \dfrac{k}{Y_2'} X_2 + k_P \cdot X_P - (k_P \cdot F_{Pabs})}{Y_1' \cdot Y_2' \cdot \dfrac{X_P}{\dot{X}_P} + \dfrac{k}{Y_1'} + \dfrac{k}{Y_2'} + \dfrac{k_P \cdot \dot{X}_P}{X_P} - (k \cdot NbTm + k_P \cdot F_{Pabs})} \quad \text{[Math. 7]}$$

$$\dot{X}_G = \frac{Y_1' \cdot Y_2' \cdot \dfrac{X_P}{\dot{X}_P} \cdot \dot{X}_0 + \dfrac{k}{Y_1'} \dot{X}_1 + \dfrac{k}{Y_2'} \dot{X}_2 + \dfrac{k_P \cdot \dot{X}_P}{X_P} \dot{X}_P - (k_P \cdot F_{Pabs})}{Y_1' \cdot Y_2' \cdot \dfrac{X_P}{\dot{X}_P} + \dfrac{k}{Y_1'} + \dfrac{k}{Y_2'} + \dfrac{k_P \cdot \dot{X}_P}{X_P} - (k \cdot NbTm + k_P \cdot F_{Pabs})}$$

$$\ddot{X}_G = \frac{Y_1' \cdot Y_2' \cdot \dfrac{X_P}{\dot{X}_P} \cdot \ddot{X}_0 + \dfrac{k}{Y_1'} \ddot{X}_1 + \dfrac{k}{Y_2'} \ddot{X}_2 + \dfrac{k_P \cdot \dot{X}_P}{X_P} \ddot{X}_P - (k_P \cdot F_{Pabs})}{Y_1' \cdot Y_2' \cdot \dfrac{X_P}{\dot{X}_P} + \dfrac{k}{Y_1'} + \dfrac{k}{Y_2'} + \dfrac{k_P \cdot \dot{X}_P}{X_P} - (k \cdot NbTm + k_P \cdot F_{Pabs})}$$

XG is preferably calculated and then differentiated to obtain the other speed and acceleration magnitudes. More targets, in particular lateral ones, could be taken into account if the perception sensors allow this.

Thanks to this method the ACC system will exhibit more comfortable behaviour on changes of target and, thanks to the anticipation of the movements of the target vehicles by the method, safety is enhanced. The behaviour of the ego vehicle EGO will therefore approach the behaviour of a human driver and will be smooth in traffic.

The invention claimed is:

1. A driver assistance method for an ego vehicle traveling in a traffic lane, the method comprising:
   identifying traffic surrounding the ego vehicle in the traffic lane of the ego vehicle and in at least one adjacent parallel lane in the same traffic direction;
   determining a virtual barycentric target, via calculating a position of the virtual barycentric target, a speed of the virtual barycentric target, and an acceleration of the virtual barycentric target;
   calculating a longitudinal speed setpoint of the ego vehicle, an acceleration setpoint, and a torque setpoint, said longitudinal speed setpoint being a function of the position of the virtual barycentric target, the speed of the virtual barycentric target, and the acceleration of the virtual barycentric target; and
   controlling the ego vehicle according to the longitudinal speed setpoint, the acceleration setpoint, and the torque setpoint calculated in the calculating,
   wherein the determining the virtual barycentric target uses a change of target prediction coefficient determined for each target; and
   wherein the change of target prediction coefficient is a function of:
      a relative lateral distance between a trajectory of the ego vehicle and at least one target vehicle, or a function of a relative lateral distance between a center of the lane in which the ego vehicle is traveling and at least one target vehicle, an estimated time of intersection of an estimated trajectory of a target vehicle with an estimated trajectory of the ego vehicle, the following time of a pre-target vehicle, or a coefficient of stiffness.

2. The driver assistance method as claimed in claim 1, wherein the surrounding traffic includes at least two target vehicles preceding the ego vehicle traveling in its traffic lane or in the adjacent parallel lane in the same traffic direction.

3. The driver assistance method as claimed in claim 2, wherein the identifying includes detecting each of the at least two target vehicles and, for each of the target vehicles, determining as output of a position of the target vehicle relative to the ego vehicle, a speed of the target vehicle, an acceleration of the target vehicle, and a trajectory of the target vehicle.

4. The driver assistance method as claimed in claim 2, wherein at least one of the target vehicles is situated in an adjacent lane and seeks to merge into the traffic lane of the ego vehicle.

5. The driver assistance method as claimed in claim 1, wherein the determining the virtual barycentric target consumes as input a preselected control speed, a predetermined following distance setpoint, and a result of the identifying.

6. The driver assistance method as claimed in claim 1, wherein the determining the virtual barycentric target includes a filtering step.

7. A driver assistance system for an ego automobile vehicle moving in a traffic lane, comprising:
   a module configured to identify traffic surrounding the ego vehicle in the traffic lane of the ego vehicle and in at least one adjacent parallel lane in the same traffic direction;
   a module configured to determine a virtual barycentric target, with calculation of a position of the virtual barycentric target, a speed of the virtual barycentric target, and an acceleration of the virtual barycentric target;
   a module configured to calculate a longitudinal speed setpoint of the ego vehicle, an acceleration setpoint, and a torque setpoint, said longitudinal speed setpoint being a function of the position of the virtual barycentric target, the speed of the virtual barycentric target, and the acceleration of the virtual barycentric target; and
   at least one actuator configured to control the ego vehicle according to the longitudinal speed setpoint, the acceleration setpoint, and the torque setpoint calculated in the calculating step,
   wherein the virtual barycentric target is determined with a change of target prediction coefficient determined for each target, and
   wherein the change of target prediction coefficient is a function of:
      a relative lateral distance between a trajectory of the ego vehicle and at least one target vehicle, or a function of a relative lateral distance between a center of the lane in which the ego vehicle is traveling and at least one target vehicle,
      an estimated time of intersection of an estimated trajectory of a target vehicle with an estimated trajectory of the ego vehicle,
      the following time of a pre-target vehicle, or
      a coefficient of stiffness.

8. An ego automobile vehicle comprising:

a powertrain; acceleration and braking means; and the driver assistance system as claimed in claim 7.

* * * * *